No. 749,785. PATENTED JAN. 19, 1904.
O. FRANK.
BATTERY PLATE.
APPLICATION FILED MAY 2, 1903.
NO MODEL.
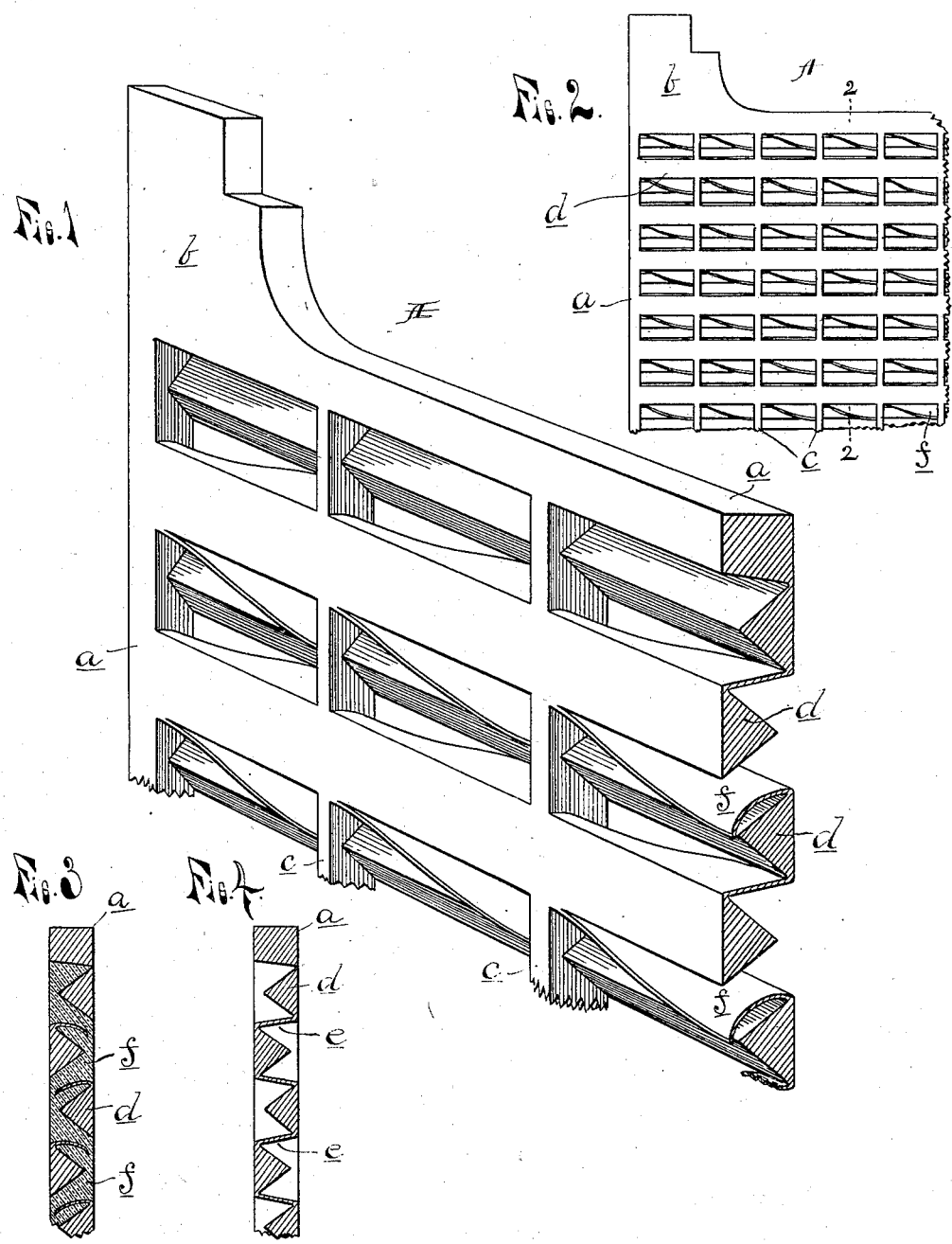
WITNESSES.
INVENTOR.
Oskar Frank
Attorneys.

No. 749,785. Patented January 19, 1904.

UNITED STATES PATENT OFFICE.

OSKAR FRANK, OF DETROIT, MICHIGAN, ASSIGNOR TO LEVI J. LENNOX AND MICHIGAN STORAGE BATTERY CO., OF DETROIT, MICHIGAN, A CORPORATION OF MICHIGAN.

BATTERY-PLATE.

SPECIFICATION forming part of Letters Patent No. 749,785, dated January 19, 1904.

Application filed May 2, 1903. Serial No. 155,300. (No model.)

*To all whom it may concern:*

Be it known that I, OSKAR FRANK, a citizen of the United States of America, residing at Detroit, in the county of Wayne and State of Michigan, have invented certain new and useful Improvements in Battery-Plates, of which the following is a specification, reference being had therein to the accompanying drawings.

My invention relates more specifically to battery-plates of the Faure type, in which so-called "grids" or "supports" are employed for holding the active material applied in the form of a paste; and the particular object of my invention is to form a grid which combines lightness with strength and efficiency to retain and firmly unite the active material with the grid.

To this end the invention consists in the peculiar and novel construction of a grid, all as more fully hereinafter described, and specifically set forth in the accompanying drawings, in which—

Figure 1 is an enlarged perspective view of a section of the battery-plate or grid. Fig. 2 is an elevation of a section of the battery-plate or grid. Fig. 3 is a vertical section of a portion of the plate on line 2 2, Fig. 2; and Fig. 4 is a similar section showing the connecting-web.

The grid A is preferably cast of suitable material, such as antimonious lead, and represents a reticulated plate consisting of a rectangular frame or border $a$, having the usual connecting-lug $b$, a series of vertical bars $c$ at equal distances apart and extending from top to bottom, and a series of connecting cross-bars $d$, extending horizontally between the vertical bars.

The vertical bars $c$ are of a thickness equal to that of the plate and their faces are flush with the faces of the plate. The connecting-bars $d$ are of triangular cross-section. Their thickness measured by the height of the triangle is about one-half of the thickness of the plate, and they are staggered on opposite sides of the plate, with the base of the triangle flush with the faces of the plate upon the opposite sides.

In casting these plates thin webs $e$ connect the bases of the opposing triangular ribs, as shown in Fig. 4, and it is in the utilization of this connecting-web that my invention particularly consists. By means of a suitable instrument or machine these webs are punched through from opposite sides to form triangular hooks $f$, as shown in Figs. 1 and 3, and I have found that where this form of plate is used it will retain and firmly unite the active material with the grid under the most severe conditions of use, while exactly the same form of plate without the connecting-web or hooks will soon permit the active material to disintegrate and fall off, especially under high duty or when going over rough roads.

A grid of this construction may be readily cast in one integral piece and the interstices filled up with the paste flush with the face of the plate and formed in the usual way into a battery-plate, and it will be understood that a plate of my construction will give a maximum of strength and stiffness with a minimum of weight and be of great durability, as it will be seen that the active material is firmly keyed in between the cross-bars on both sides of the plate and by the hooks $f$.

Having thus fully described my invention, what I claim is—

1. A grid for secondary battery-plate cast in one piece with an outer frame forming a border and oppositely-disposed horizontal cross-bars of triangular cross-section connecting the sides of the frame at intervals apart and webs connecting said bars and adapted to form retaining-hooks for the active material.

2. A grid for secondary battery-plate cast in one piece with an outer frame forming a border, vertical bars spaced at intervals apart and horizontal cross-bars of triangular cross-section connecting the vertical bars at intervals apart and with the base of the triangles flush alternately with the opposite faces of the plate, and hooks carried by the bars.

3. A grid for secondary battery-plate cast in one piece with an outer frame forming a border, vertical bars spaced at intervals apart and horizontal cross-bars of triangular cross-section connecting the vertical bars at intervals apart and with the base of the triangles flush alternately with the opposite faces of the plate and oppositely-disposed hooks integrally formed with the base of said bars.

4. A grid for secondary battery-plate cast in one piece with an outer frame forming a border, vertical bars spaced at intervals apart and horizontal cross-bars of triangular cross-section connecting the vertical bars at intervals apart and with the base of the triangles flush alternately with the opposite faces of the plate, and webs connecting said bars and adapted to form hooks.

5. A grid for secondary battery-plate cast in one piece with an outer frame forming a border, vertical bars spaced at intervals apart and horizontal cross-bars of triangular cross-section connecting the vertical bars at intervals apart and with the base of the triangles flush alternately with the opposite faces of the plate, the bars being staggered upon opposite sides of the plate and webs connecting the bases of said bars and adapted to form hooks.

6. A grid for secondary battery-plate cast in one piece with an outer frame forming a border, vertical bars spaced at intervals apart and horizontal cross-bars of triangular cross-section and a thickness less than that of the plate measured by the height of the triangular cross-section said cross-bars connecting the vertical bars at intervals apart and with the base of the triangles flush alternately with the opposite faces of the plate, the bars being staggered upon opposite sides of the plate, and webs connecting the bases of the opposite bars and adapted to form retaining-hooks for the active material.

In testimony whereof I affix my signature in presence of two witnesses.

OSKAR FRANK.

Witnesses:
THOMAS G. LONGSTAFF,
OTTO F. BARTHEL.